(12) United States Patent
Poggioli et al.

(10) Patent No.: US 10,226,150 B2
(45) Date of Patent: Mar. 12, 2019

(54) FILTER HOLDER FOR BEVERAGE PRODUCING MACHINES

(71) Applicant: KONINKLIJKE PHILIPS N.V., Eindhoven (NL)

(72) Inventors: Massimo Poggioli, Eindhoven (NL); Moreno Carniel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 260 days.

(21) Appl. No.: 15/108,797

(22) PCT Filed: Dec. 19, 2014

(86) PCT No.: PCT/EP2014/078613
§ 371 (c)(1),
(2) Date: Jun. 29, 2016

(87) PCT Pub. No.: WO2015/104163
PCT Pub. Date: Jul. 16, 2015

(65) Prior Publication Data
US 2016/0316960 A1    Nov. 3, 2016

(30) Foreign Application Priority Data

Jan. 10, 2014    (EP) .................................... 14150847

(51) Int. Cl.
*A47J 31/36* (2006.01)
*A47J 31/44* (2006.01)
*A47J 31/06* (2006.01)

(52) U.S. Cl.
CPC ....... *A47J 31/4464* (2013.01); *A47J 31/0605* (2013.01); *A47J 31/0615* (2013.01); *A47J 31/0657* (2013.01); *A47J 31/0621* (2013.01)

(58) Field of Classification Search
CPC .. A47J 31/0605; A47J 31/061; A47J 31/0615; A47J 31/0621
USPC ........................................ 99/299, 302 R, 323
See application file for complete search history.

(56) References Cited

U.S. PATENT DOCUMENTS 5,197,373 A * 3/1993 De Jong ............... A47J 31/043
99/283
8,635,946 B2 * 1/2014 White ................. A47J 31/0621
99/279

FOREIGN PATENT DOCUMENTS

| EP | 0726053 A1 | 8/1996 |
|---|---|---|
| EP | 1656861 A1 | 5/2006 |
| WO | 2009040856 A2 | 4/2009 |

* cited by examiner

*Primary Examiner* — Reginald Alexander

(57) ABSTRACT

A filter holder including a housing with a bottom and an aperture through the bottom; a valve with a stopper for opening and closing the aperture, the stopper supported by a pivoting arm and biased towards a closed position; a cam arranged between the bottom and the pivoting arm, and having a cam profile co-acting with the pivoting arm, and being biased towards a first position wherein the cam profile prevents closing of the stopper and having a second position wherein the cam profile allows closing of the stopper; a slider which co-acts with the cam to move the cam from the first position towards the second position. The slider is biased in an inactive position and is moved towards an active position by co-action with a locking ring whereto the filter holder is attached. The slider when moved towards the active position pushes the cam towards the second position.

15 Claims, 15 Drawing Sheets

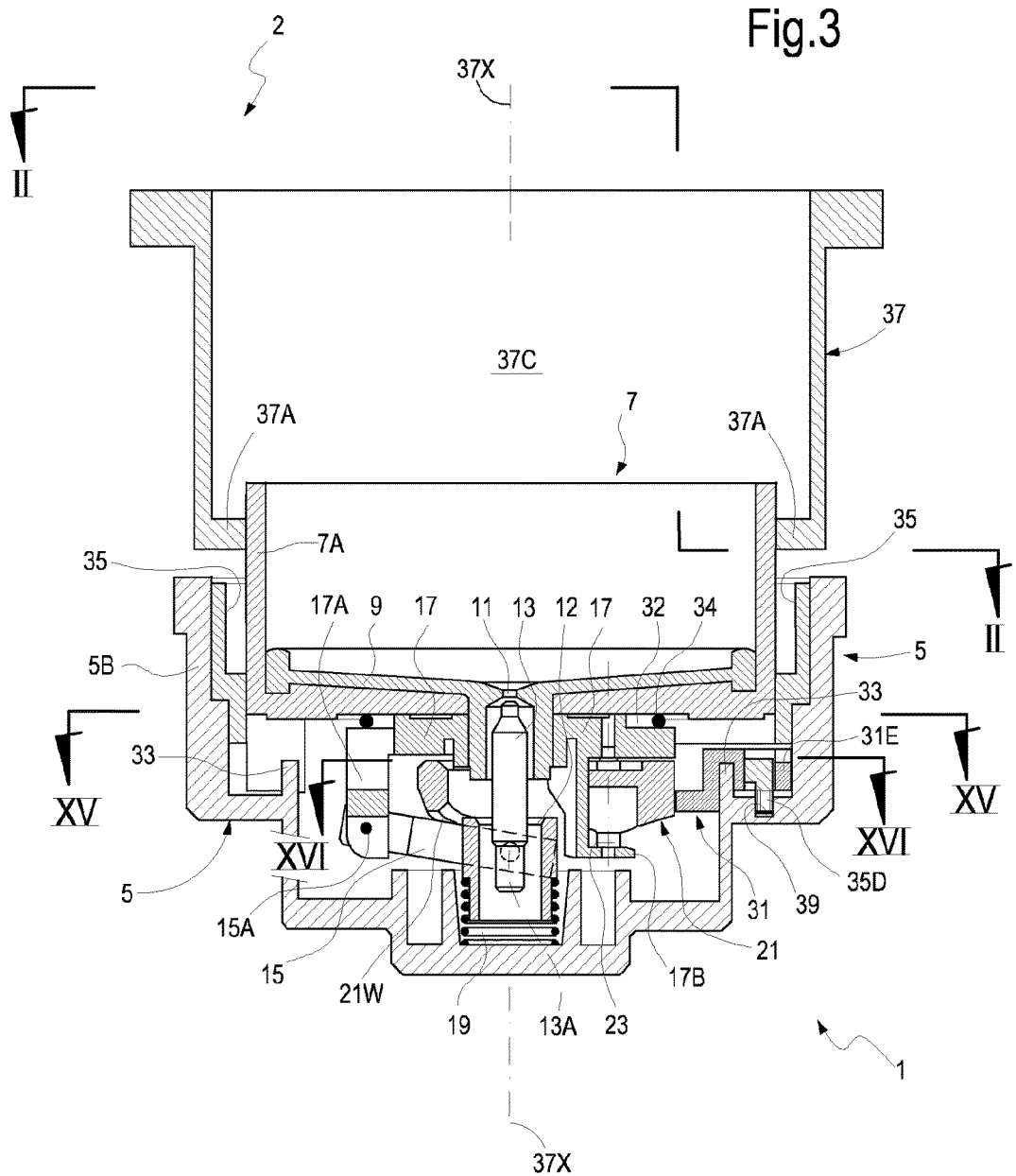

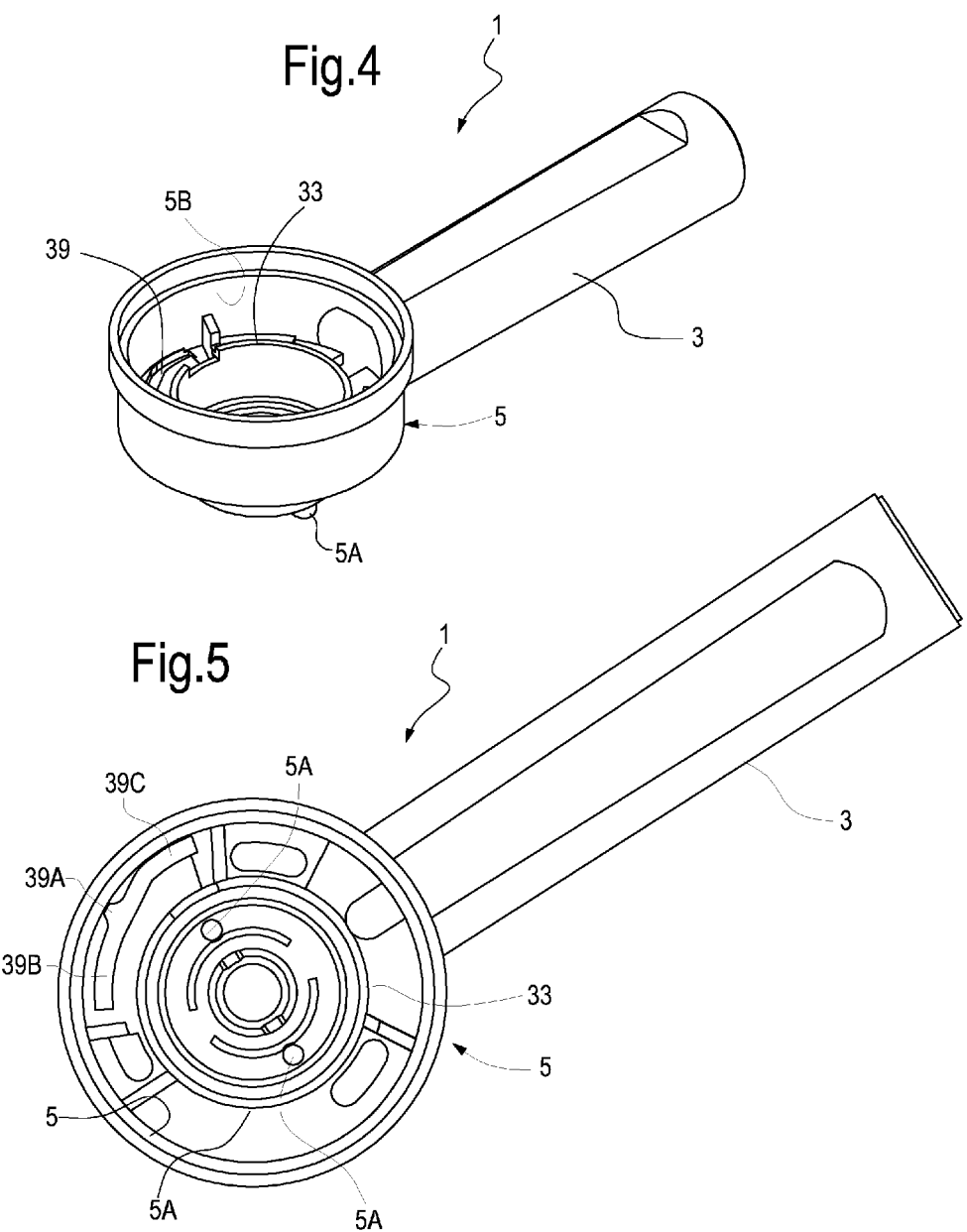

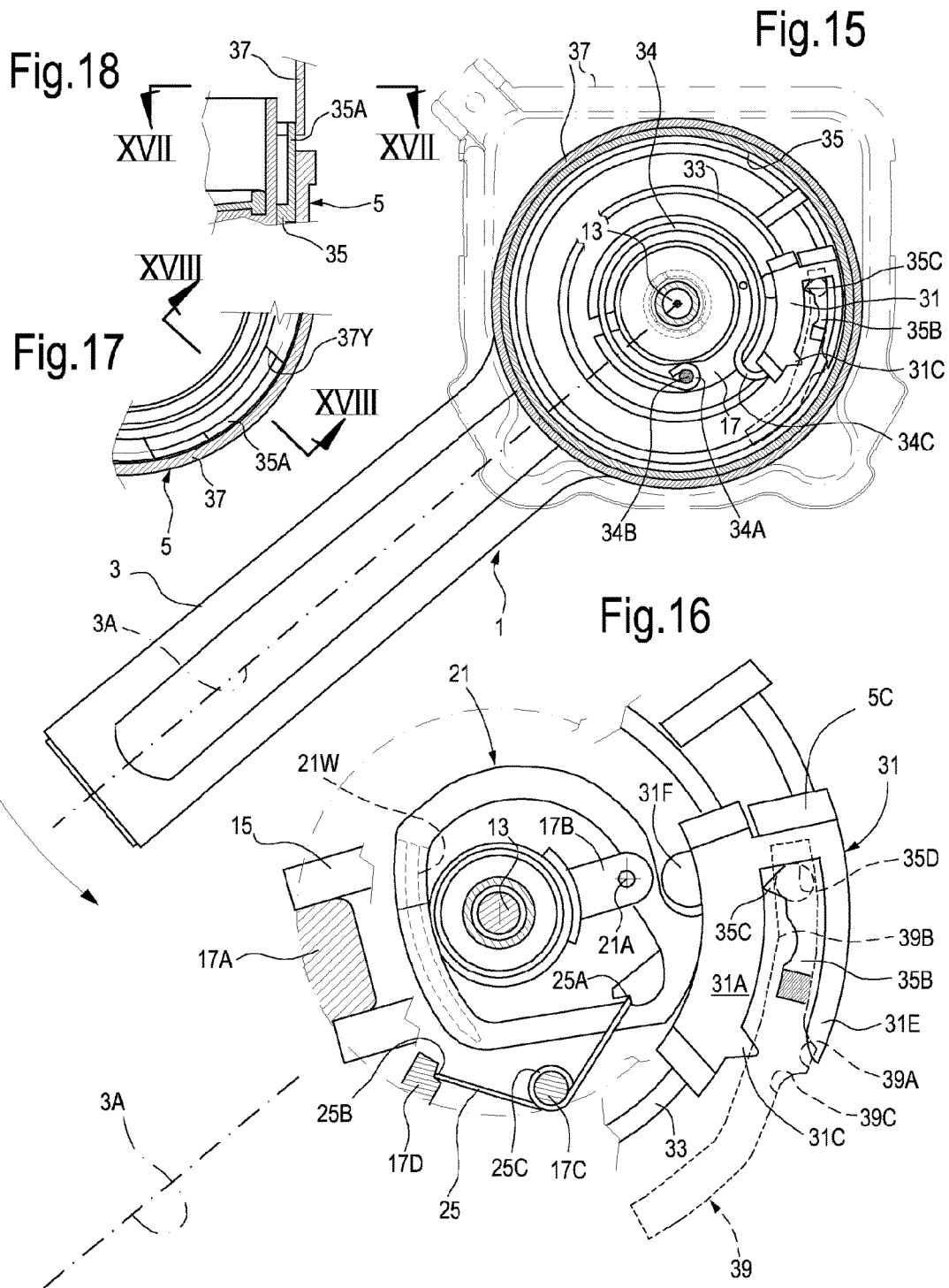

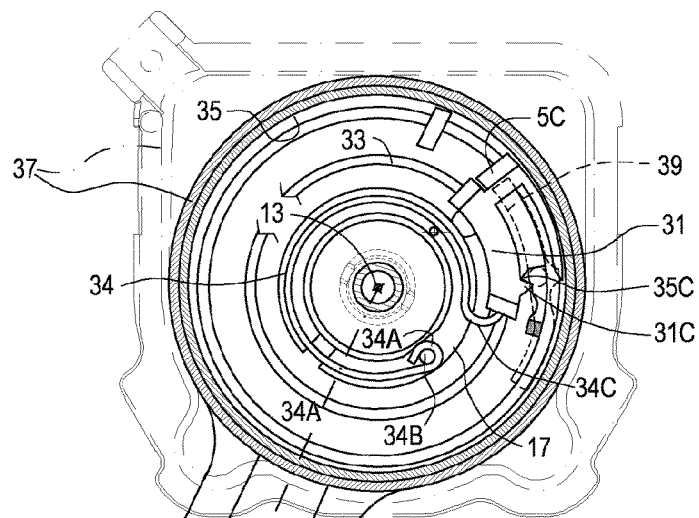
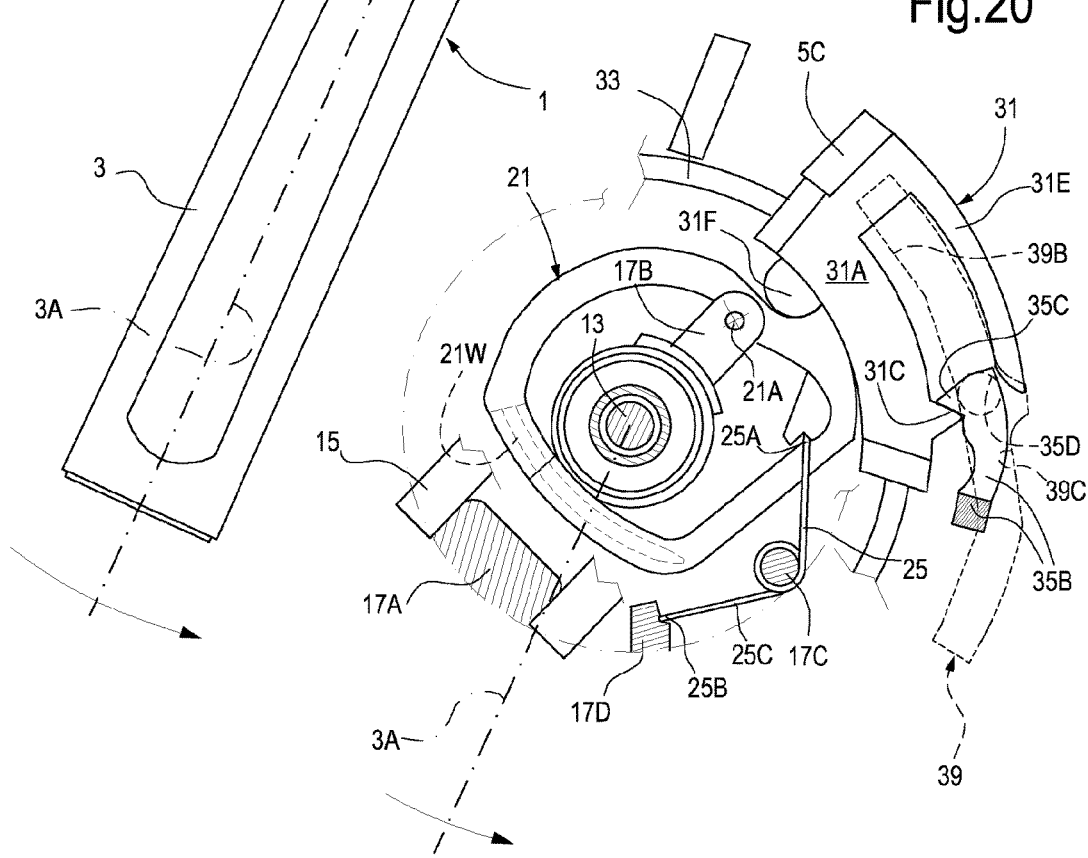

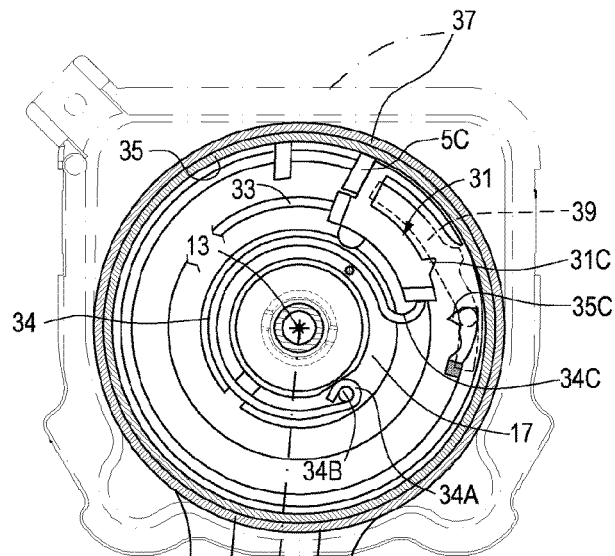
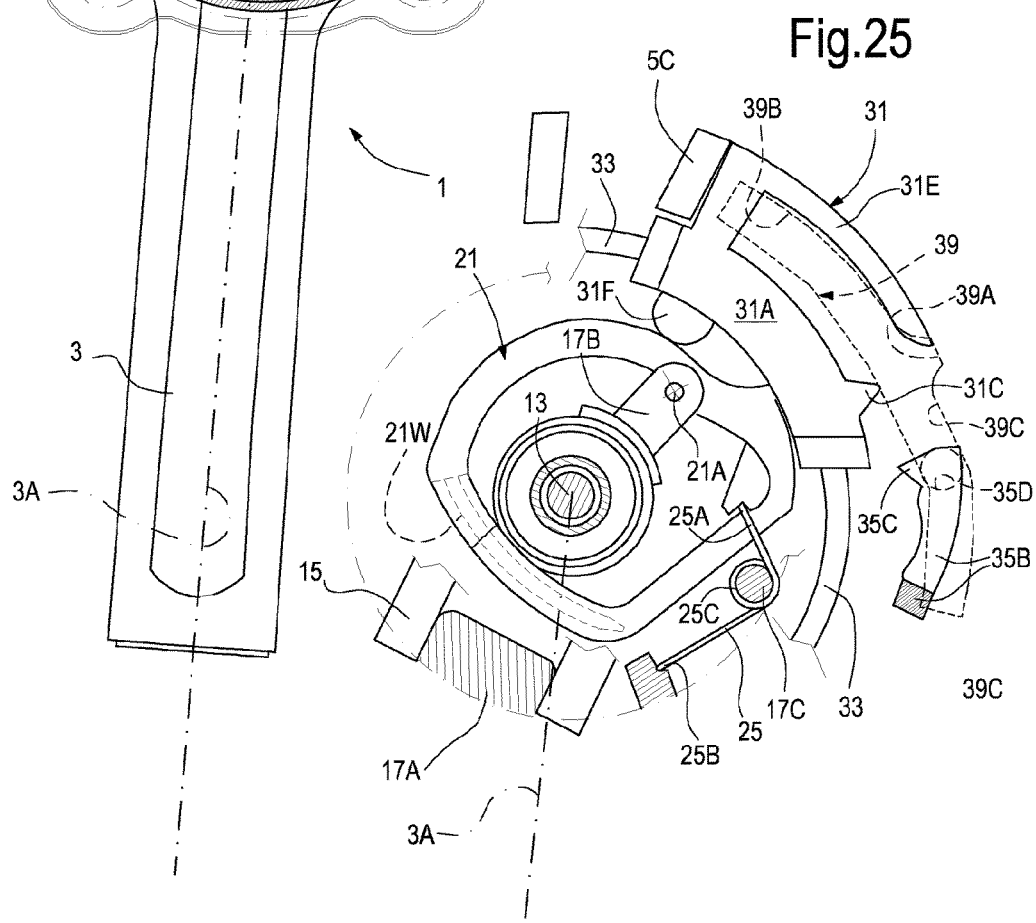

FILTER HOLDER FOR BEVERAGE PRODUCING MACHINES

This application is the U.S. National Phase application under 35 U.S.C. § 371 of International Application No. PCT/EP2014/078613, filed on Dec. 19, 2014, which claims the benefit of International Application No. 14150847.3 filed on Jan. 10, 2014. These applications are hereby incorporated by reference herein.

FIELD OF THE INVENTION

The present invention concerns the field of beverage-producing machines. More specifically the invention concerns improvements to filter holders provided with a filter cup and a housing for the filter cup, which is constrained to a handle for connection of the filter holder to a hot-water dispensing unit of the beverage producing machine, e.g. in an espresso machine. Machines and filter holders of this kind are commonly used for the production of espresso coffee from coffee powder in bulk form or in single-serving packages, such as capsules, cartridges, pods or the like.

BACKGROUND OF THE INVENTION

EP-A-0726053 discloses a filter holder for espresso machines, comprising a filter-cup housing provided with a bottom and a coffee dispensing aperture through the bottom. This known device further comprises a valve with a valve stopper which selectively closes and opens the dispensing aperture. The stopper is supported by a pivoting arm and is resiliently biased in a closed position. A pivoting cam is located between the bottom of the filter-cup housing and the pivoting arm of the stopper, for preventing the stopper from closing in certain operating conditions. The valve closes the dispensing aperture before starting a brewing cycle, preventing coffee from flowing through the filter until a sufficient brewing pressure builds in the coffee cake. Only upon reaching a brewing pressure, which is determined by the resilient force applied to the valve stopper, the valve opens and coffee is dispensed through the aperture. Once the valve stopper has moved to the open position, the pivoting cam moves in an active position, where it prevents the valve stopper from closing the aperture again.

SUMMARY OF THE INVENTION

According to the invention an improved filter holder of the type described above is provided, comprising an improved device for closing the valve stopper when the filter holder is attached to a loading ring, and for locking the valve stopper in the open position once the brewing pressure in the filter holder has been achieved.

According to the invention, a filter holder is provided, comprising a filter housing having a bottom and a dispensing duct or aperture through said bottom. A valve with a valve stopper is arranged for selectively opening and closing the dispensing duct or aperture, the valve stopper being supported by a pivoting arm and resiliently biased towards a closed position. The valve stopper is closed when the filter holder is attached to a hot-water dispensing unit of a beverage producing machine, so that hot pressurized water will soak a beverage ingredient, for instance coffee powder, loaded in the filter cup. The valve is calibrated so that it will open once a certain pressure in the filter cup has been achieved. Once opened, the valve stopper will remain open irrespective of the pressure inside the filter cup, by means of the arrangement described here below. The filter holder further comprises a cam located between the bottom of the filter housing and the pivoting arm which supports the valve stopper. The cam has a cam profile co-acting with the pivoting arm. The cam is movable, preferably around a pivoting or hinge axis to selectively take different positions. More particularly, the cam has at least a first position wherein the cam profile prevents closing movement of the valve stopper and a second position wherein the cam profile allows closing movement of the valve stopper. The cam is resiliently biased towards the first position by a suitable resilient member, for example a spring, such as a torsion spring. Furthermore, the filter holder comprises a slider which co-acts with the cam to move the cam from the first position towards the second position against the resilient action applied on the cam. The slider is advantageously resiliently biased in an inactive position and is forced to move towards an active position by direct or indirect co-action with a stationary element of a water dispensing unit whereto the filter holder is attached. The slider is configured and arranged so that during said movement from the inactive position to the active position, the slider pushes the cam towards the second position, i.e. the cam position which allows closing of the valve stopper. The resilient force applied on the slider is overcome by the co-action of the slider with the above mentioned stationary element. Once the co-action with the stationary element ceases, the slider is resiliently returned to the inactive position.

With this arrangement once the slider has brought the cam in the second position, the valve stopper is closed by the resilient force applied thereto. The cam profile is configured such that a return movement of the cam under the resilient force applied thereto is not possible unless the valve stopper opens again. The cam is retained in the second position by the friction force between the cam and the pivoting arm which supports the valve stopper. The friction force is generated by resilient force applied to the valve stopper, e.g. by a spring, for instance a helical compression spring.

Only once the brewing pressure inside the filter cup achieves a value sufficient to overcome the resilient force which keeps the valve stopper in the closed position, the valve stopper will open causing a pivoting movement of the pivoting arm. The cam is thus released and will return in its first position under the resilient force applied thereto. Once the pressure inside the filter cup lowers, e.g. at the end of an espresso brewing cycle, closure of the valve stopper is prevented by the cam, which has moved in the first, valve-closure preventing position.

The movement of the slider and consequently the movement of the cam do not require any special action on behalf of the user. The simple connection movement required for connecting the filter holder to the hot water dispensing unit will provoke the movement of the slider and thus of the valve.

In some embodiments, the filter holder has a bayonet-type locking mechanism, for locking the filter holder to the hot water dispensing unit. The filter holder has at least two opposing tangential ribs co-acting with corresponding locking profiles on the hot water dispensing unit. The user locks the filter holder to the hot water dispensing unit by means of a simple rotation of the filter holder with respect to the hot water dispensing unit by an angle of less than 180°, for example from about 30° to about 80°. The direct or indirect co-action of the slider with a stationary component of the hot water dispensing unit will trigger the movement of the cam from the first position to the second position during the locking movement of the filter holder to the hot water dispensing unit.

In preferred embodiments the filter holder is provided with a handle which makes handling of the filter holder simple and safe.

In some embodiments the cam is pivotally connected to the bottom of the filter housing around a first pivoting axis which can be approximately orthogonal to the bottom of the filter housing, i.e. approximately parallel to the axis around which the rotation movement of the filter holder occurs, when the latter is locked to the hot water dispensing unit. The pivoting axis of the cam is preferably oriented at about 90° with respect to a second pivoting axis, about which the pivoting arm is moving, which supports the valve stopper.

The slider is preferably guided by a guide member. For instance, in some embodiments a guide member is provided, whereon the slider is movably mounted. The guide member is constrained to the filter housing and to the handle of the filter holder, so that it moves integrally therewith during the movement performed by the filter holder during locking thereof to the hot water dispensing unit.

Advantageously the guide member is circular in shape and extends substantially coaxially to the valve stopper.

The filter holder is usually comprised of two main components, namely the filter housing and a handle. The handle is constrained to the filter housing so as to rotate therewith. In advantageously embodiments, the filter housing is mounted on a seat which can be constrained to the handle and rotated therewith. The filter housing is in turn constrained to the seat so as to rotate therewith. Manufacturing and assembling of the filter holder is thus made particularly efficient. The cam can be arranged in a space between the seat and the filter housing. This results in a particularly effective arrangement of components. The guide can be integrally formed on the bottom wall of a seat of the filter holder, wherein the filter housing is arranged.

The pivoting arm, which supports the valve stopper, and the cam can be arranged between the filter housing and a bottom wall of the seat. The bottom wall of the seat can be provided with one or more, typically two, beverage dispensing ports. The beverage flowing from the filter holder through the dispensing aperture is dispensed through the dispensing port(s) formed in the bottom wall of the seat wherein the filter housing is placed.

According to some embodiments, the seat can be made of molded metal or plastic material, and can be formed with a ridge or projection, forming a guide whereon the slider is mounted.

A first resilient member, for instance a compression spring, such as a helical compression spring, which resiliently biases the valve stopper towards the closed position, can be arranged between the bottom of the seat and the valve stopper. The bottom of the seat can have a recess where one end of the spring can be placed. The opposite end of the spring can be located in or around a cylindrical retention member integral with the valve stopper.

In some embodiments, the filter housing can comprise a cam support mounted on the bottom of the filter housing, on the outer surface thereof, i.e. between the filter housing and the seat. The cam can be pivotally connected to the cam support. The cam support can be molded as a single piece of plastic, shaped so as to provide a hinge for mounting the pivoting arm and a hinge for pivotally mounting the cam. The pivoting arm and the cam can be assembled on the cam support and the latter can then be mounted on the exterior of the filter housing, projecting from the bottom thereof. This simplifies manufacturing and assembling procedures. The unit formed by the filter housing and the cam support can then be mounted in the seat. A particularly simple and inexpensive arrangement is thus obtained.

In some embodiments, the filter housing can be comprised of a cup-shaped body forming a recess, in which the filter cup, or else directly a pod, capsule or cartridge, can be placed. The cup-shaped body of the filter holder has a bottom wall with a surface facing the interior of the recess and an opposite surface whereon the cam support is mounted, along with the cam and the pivoting arm which supports the valve stopper.

A second resilient member can be arranged on the filter housing, for resiliently biasing the slider in the inactive position thereof. The second resilient member is preferably located between the filter housing and the cam support constrained thereto. For instance, the cam support and the lower surface of the filter housing can once assembled to one another can form a recess there between, wherein the second resilient member can be housed. In some embodiments the second resilient member has the shape of an open ring, with a first end constrained to the filter housing and a second end projecting from said recess and acting against the slider.

In some embodiments, a third resilient member is constrained to the filter housing, preferably on the cam support, for resiliently biasing the cam in the first position thereof.

In order to angularly displace the slider and the cam when the filter holder is attached to the hot water dispensing unit and locked thereto, a lever or similar element can be constrained to the locking ring whereto the filter holder is connected, e.g. by means of a bayonet connection. The lever can be arranged for co-action with the slider, so that the slider will be stopped in a predetermined angular position with respect to the locking ring, before the filter holder reaches its final angular position. Thus, continuing the rotation of the filter holder will cause an angular movement of the slider with respect to the filter holder. This movement causes the cam to pivot and take up a position which allows the valve stopper to close. The lever on the locking ring and the slider can be designed so that once the cam has rotated by a certain amount allowing the valve stopper to close, the lever is forced to release the slider which will then be pushed back into its original angular position with respect to the filter holder, by a resilient member acting thereon.

According to other, particularly advantageous embodiments, in order to avoid the need of providing a lever on the locking ring, the filter holder can comprise an actuating ring arranged around the filter housing and co-acting with the slider and with the locking ring. The actuating ring can have a limited angular movement with respect to the filter housing. The actuating ring can be provided with projections or ridges which co-act with stationary components of the hot water dispensing unit. In some embodiments, the actuating ring is provided with two approximately diametrically opposed ridges. In a first mutual angular position of the actuating ring with respect to the filter housing, these ridges are angularly aligned with corresponding tangential ribs of the filter housing. In a second mutual angular position the ridges and the ribs are angularly offset, i.e. the actuating ring is angularly shifted with respect to the filter housing. This angular displacement is obtained by co-action of the actuating ring with the stationary hot water dispensing unit: the bayonet latching mechanism on the hot water dispensing unit forms an abutment against which the ridges of the actuating ring abut, before the filter-holder has achieved its final angular locking position. The filter holder is thus rotated further, while the actuating ring remains stationary, so that the actuating ring actually rotates with respect to the remaining components of the filter holder, in particular with respect to the filter housing.

Since the actuating ring co-acts with the slider, the relative movement between actuating ring and filter holder provokes an angular movement of the slider with respect to the filter housing, as the slider remains temporarily locked to the actuating ring.

In some embodiments, connection between the actuating ring and the slider can be provided by a latch mechanism which selectively constrains the actuating ring to the slider and releases the slider from the actuating ring once a certain angular displacement of the slider with respect to the filter housing has been reached. Once released, the slider can angularly shift with respect to the actuating ring.

As will be explained in more detail later on, in connection with an exemplary embodiment, while entrained by the actuating ring, the slider moves angularly with respect to the filter housing and displaces the cam from the first position to the second position thereof. Once the angular displacement between the slider and the filter housing has been completed, the slider is released from the actuating ring and is resiliently returned to its original position, while the cam remains in the second position just achieved under the control of the actuating ring and of the slider, due to the friction between the pivoting arm and the cam. The cam will be released and will resiliently returned in the first position only upon opening of the valve stopper under the water pressure in the filter cup.

In some embodiments the latch mechanism between the actuating ring and the slider can comprise a first tooth constrained to the actuating ring and a second tooth constrained to the slider. The first tooth and the second tooth co-act with one another to selectively angularly constraining the slider to the actuating ring and angularly releasing the slider and the actuating ring from one another.

In some embodiments, the second tooth is radially outwardly movable in a release position, where the first tooth and the second tooth are disengaged from one another, when the actuating ring and the filter housing have achieved a mutual angular shift. The radial outward movement of the tooth can be controlled by a cam profile. The latter can be provided for instance in the bottom of the seat where the filter housing is located.

Further features and embodiments of the filter holder according to the invention are described here below and are set forth in the dependent claims, which form an integral part of the present description.

The invention also concerns a beverage producing machine including a hot water dispensing unit and a filter holder as described, which can be connected to the hot water dispensing unit, e.g. by means of a bayonet type locking mechanism.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings:

FIG. 3 illustrates a vertical cross-sectional view according to line III-III in FIG. 2 of the filter holder and of the locking ring;

FIG. 4 illustrates a perspective view of the handle and the filter seat of the filter holder;

FIG. 5 illustrates a top view of the handle and seat of the filter holder of FIG. 4;

FIG. 15 is a cross-sectional view according to line XV-XV of FIG. 3;

FIG. 16 is a cross-sectional view according to line XVI-XVI of FIG. 3;

FIG. 17 is a cross-sectional view according to line XVII-XVII of FIG. 18;

FIG. 18 is a cross-sectional view according to line XVIII-XVIII of FIG. 17;

FIGS. 19 and 20 are views similar to FIGS. 15 and 16 in a different angular position of the filter holder;

FIGS. 24 and 25 are views similar to FIGS. 21 and 22 with the filter holder in the final operating position;

FIGS. 21 and 22 are views similar to FIGS. 19 and 20 in a yet a further angular position of the filter holder;

FIG. 23 is a vertical cross-sectional view according to line XXIII-XXIII of FIG. 22;

FIGS. 24 and 25 are views similar to FIGS. 19 and 20 in the final position of the filter holder and inner components thereof;

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description reference will be made to a filter holder for brewing coffee from coffee powder. It shall however be understood that the same filter holder can be used for the production of different kinds of beverages, by loading one or more beverage ingredients in the filter holder, either in a pre-packed or bulk (i.e. lose) form.

Figure 1:
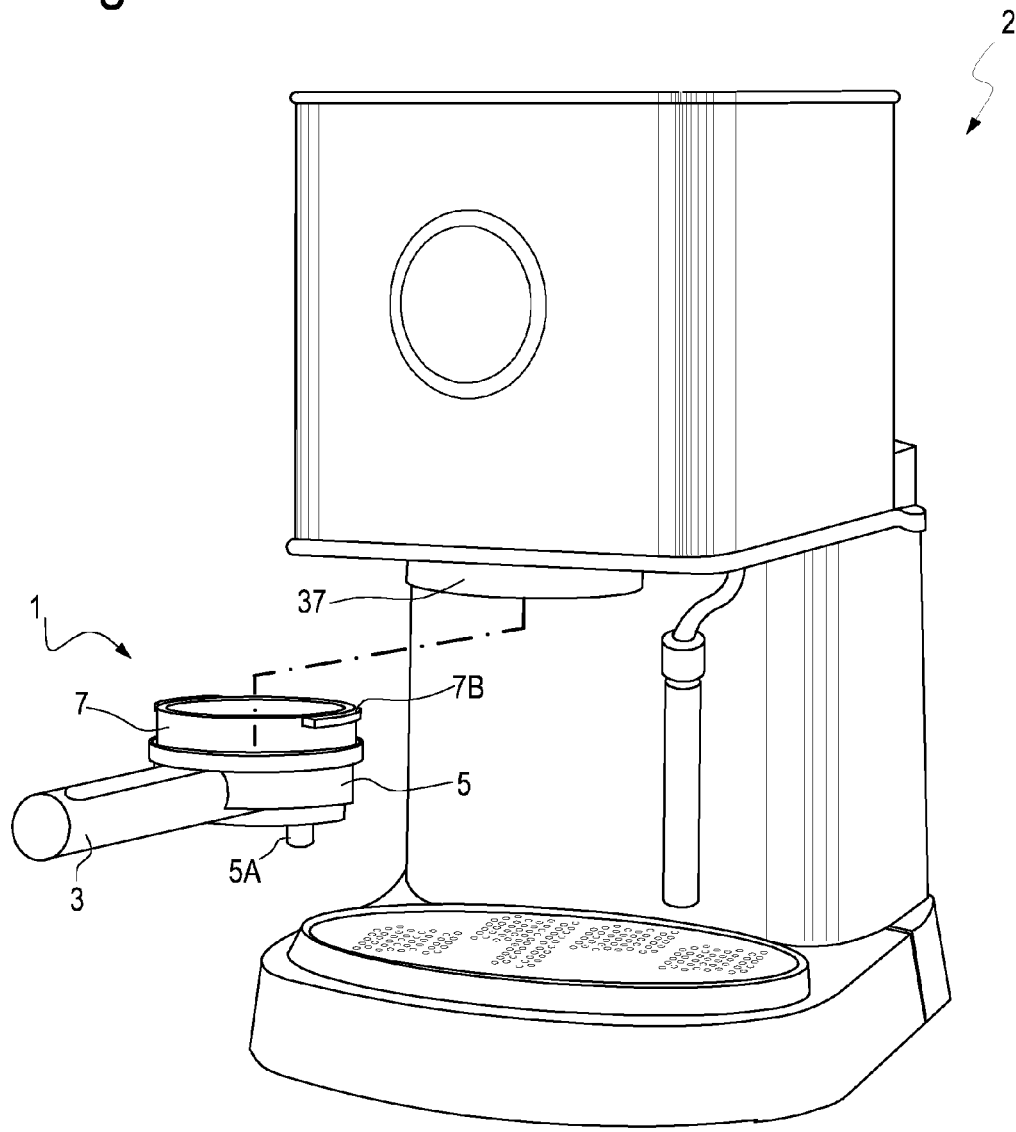
FIG. 1 illustrates a perspective view of a coffee machine comprising a filter holder according to the invention.

According to some embodiments of the invention, a filter holder 1 is provided, having a filter-holder handle 3 rigidly connected to a seat 5. The seat 5 houses a filter housing 7 which can be arranged in and constrained to the seat 5. FIG. 1 illustrates the filter holder 1 in combination with a coffee machine 2, more specifically an espresso machine in this embodiment. The coffee machine comprises a hot-water dispensing unit, comprised of a locking ring 37, whereto the filter holder 1 is reversibly attached.

The filter housing can be designed for receiving a single-serving package, such as a capsule, pod or cartridge, containing coffee powder. In other embodiments, the filter holder can be arranged for receiving bulk coffee powder. In this case, a filter cup can be removably arranged in the filter housing, the filter cup having a perforated bottom, which allows coffee to flow through while preventing coffee powder to escape the cup.

Figure 2:
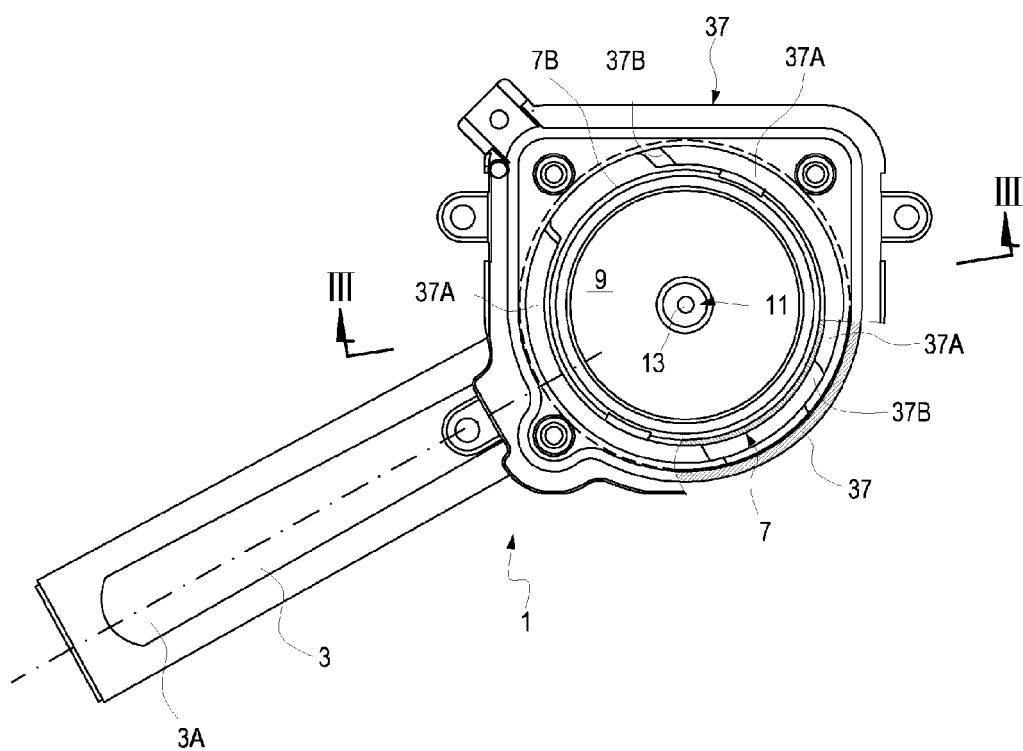
FIG. 2 illustrates a top view and partial section along line II-II of FIG. 3 of the filter holder attached the locking ring of the coffee machine.
Figure 13:
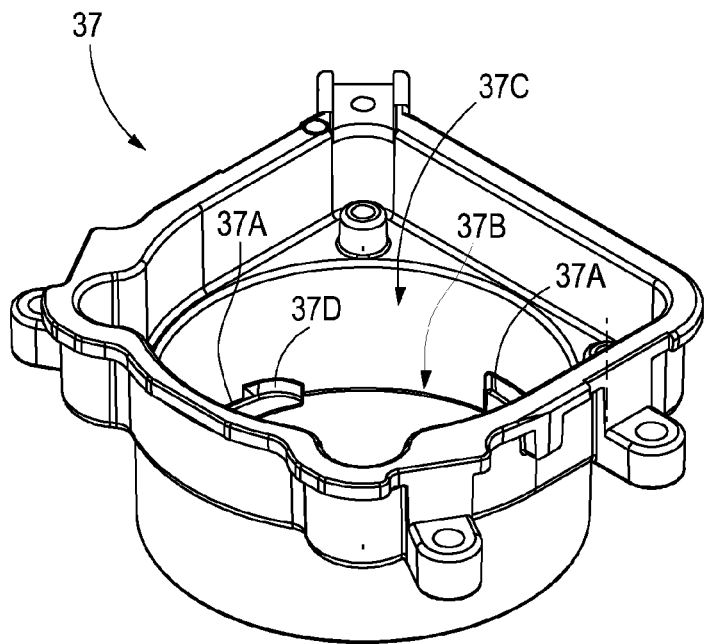
FIGS. 13 and 14 illustrate a perspective view an a top view of the locking ring of the coffee machine, whereto the filter holder is connected.
Figure 14:
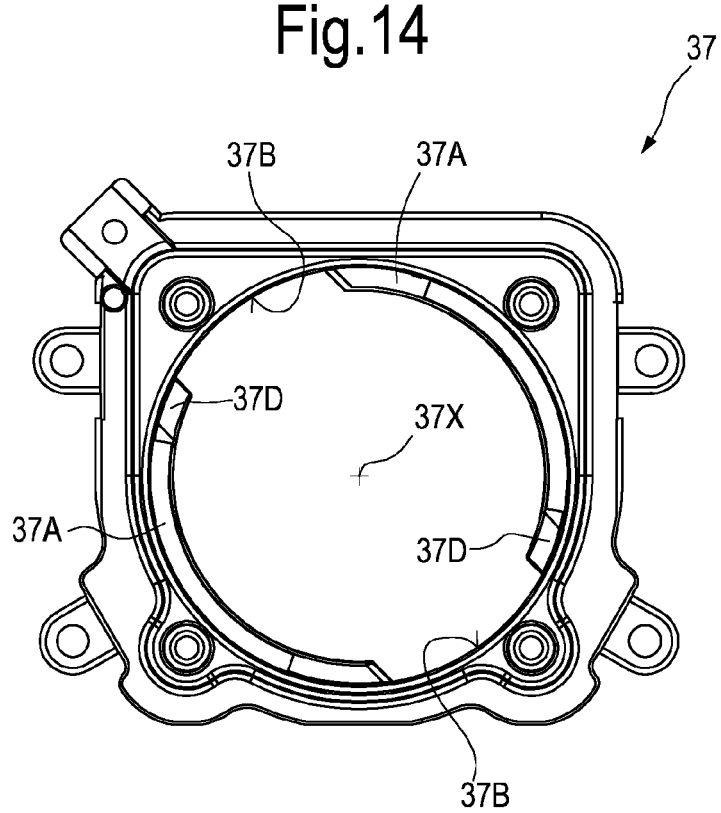

The structure of the filter holder will first be described, referring specifically to FIGS. 2-12. FIG. 3 illustrates a sectional view of the filter holder partly connected to the locking ring of the coffee machine 2, while FIG. 2 illustrates a cross-sectional view according to line II-II in FIG. 3. For a better understanding of the filter holder structure, the main components thereof are shown in isolation, in different views, if necessary, in FIGS. 4 to 12, while FIGS. 13 and 14 illustrate the locking ring in a perspective and top view, respectively, said locking ring forming part of the coffee machine 2.

In the embodiment illustrated in the figures, the filter housing 7 comprises a bottom 9 with a through duct or aperture 11, see in particular FIG. 3, where through coffee is dispensed. In the interior of the filter housing 7 a single-serving cartridge or capsule can be placed, through which hot and pressurized water is dispensed in order to extract the ingredients from the coffee powder contained in the capsule and produce the coffee, which flows through the aperture 11. As best shown in FIG. 5, the seat 5 where the filter housing 7 is mounted has coffee outlet ports 5A, where through coffee can be dispensed in a cup or the like.

Figure 6:
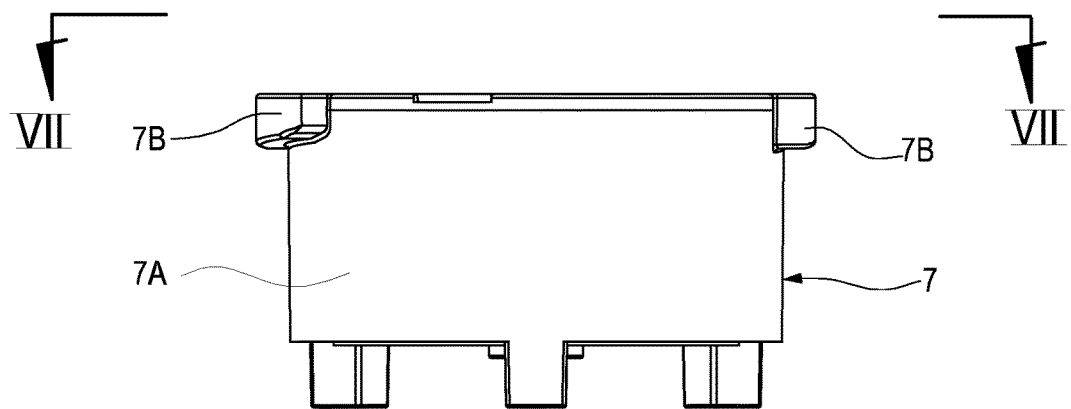
FIG. 6 illustrates a side view a filter housing.
Figure 7:
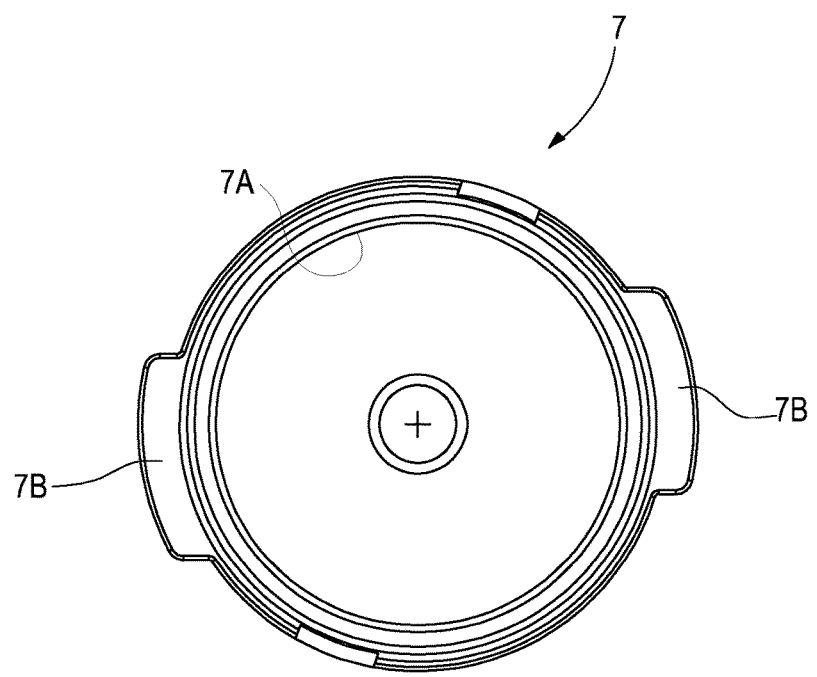
FIG. 7 illustrates a top view according to line VII-VII in FIG. 6.

The filter housing 7 is shown in isolation in a side view and in a plan view in FIGS. 6 and 7, for a better illustration of the structure thereof.

Referring in particular to FIG. 3, under the filter housing 7 a valve 12 is located, which is provided with a valve stopper 13. The valve stopper 13 is configured and arranged for selectively opening and closing the coffee dispensing aperture 11. The valve stopper 13 can be supported by a pivoting arm 15 which is hinged at 15A to a support member 17. The support member 17 is shown in isolation in FIG. 10 in a perspective view, where the support 10 is rotated upside down, to better show the structure thereof. More specifically, the pivoting arm 15 is hinged to a bracket 17A formed by or mounted on the support member 17.

In preferred embodiments the support member 17 is connected, e.g. screwed, on the outer surface of the bottom 9 of the filter housing 7.

In some embodiments the valve stopper 13 can be hinged at 13A to the pivoting arm 15. The valve stopper 13 is resiliently biased towards the aperture 11 by a first resilient member, e.g. a spring, for instance a helical compression spring 19, which can be arranged between the valve stopper 13 and the bottom of the seat 5, as shown for instance in FIG. 3.

A substantially annular shaped cam or wedge 21 is pivotally connected to the filter housing 7. The cam 21 is shown in isolation in FIG. 11 to better show the structure thereof. The cam 21 has a pivoting axis 21A and is hinged by means of a pivot 23 to a bracket 17B of the support member 17 for rotation around said axis 21A. The pivoting axis 21A which is generally orthogonal to the bottom 9 of the filter housing 7 and generally at 90° with respect to the pivoting axis 15A of pivoting arm 15.

Figure 11:
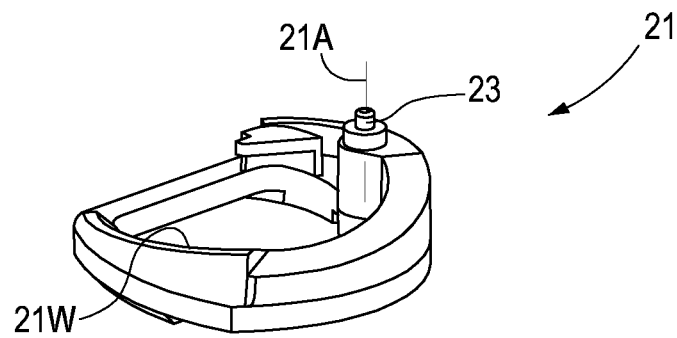
FIG. 11 illustrates a bottom perspective view of an annularly shaped cam provided for locking the valve stopper in an open position upon completion of a brewing cycle.
Figure 23:
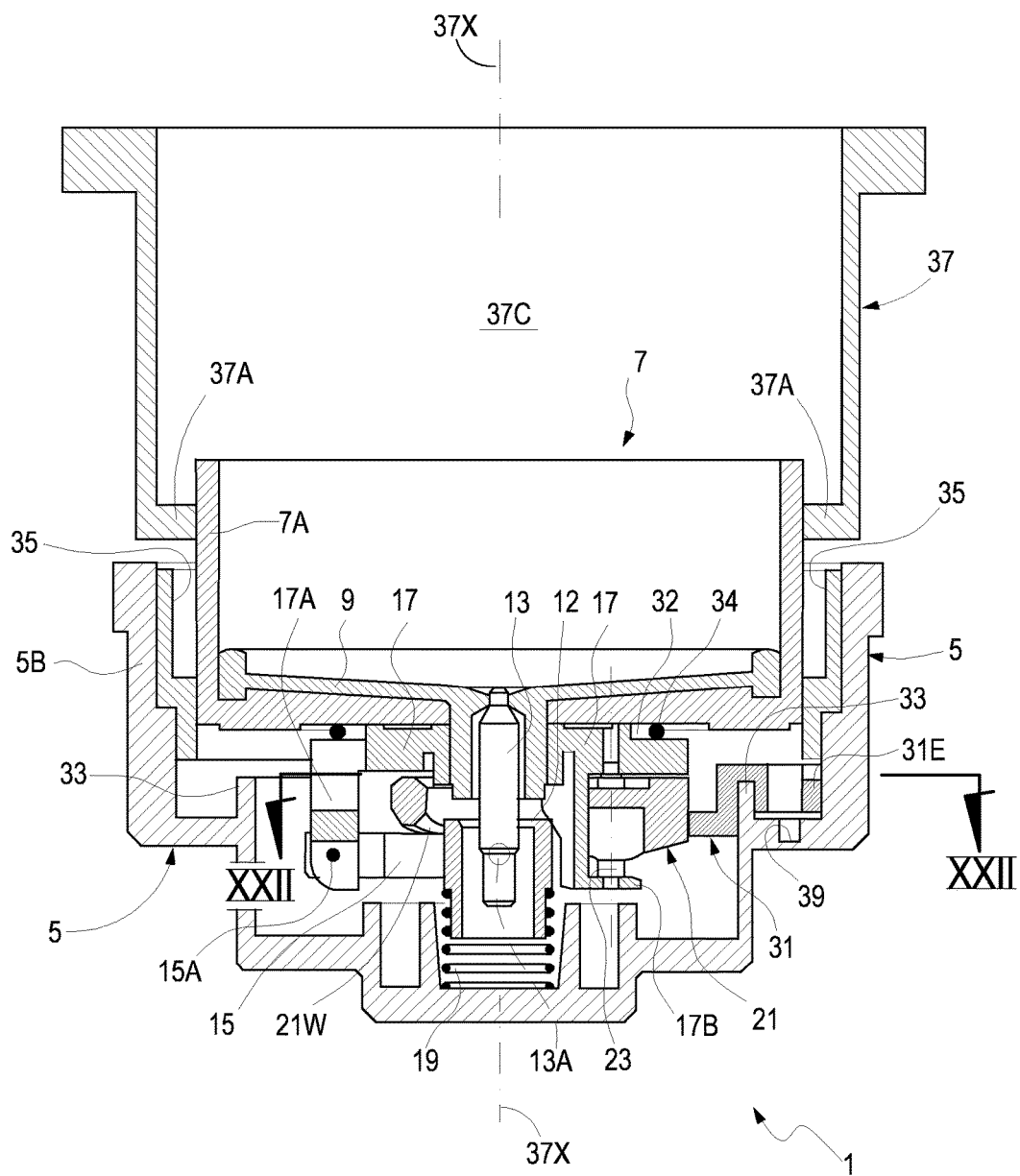
FIG. 23 is a vertical cross-sectional view along line XXIII-XXIII of FIG. 22.

As best shown in FIG. 11, the cam 21 has a wedge-shaped portion or cam profile 21W, which has a variable thickness and which is located between the pivoting arm 15 and the support member 17. As will become more apparent from the description of the operation of the device 1, the wedge-shaped portion 21W of cam 21 is used for selectively preventing or allowing closure of the valve stopper 13 depending upon the operating step. More specifically, the cam 21 can be moved between a first position where the cam prevents the valve stopper 13 from closing (see FIG. 3) and a second position where the cam 21 allows the valve stopper 13 to close (FIG. 23). In the first position the thicker part of the wedge portion 21W of the cam 21 is located between the pivoting arm 15 and the support member 17, while in the second position the thinner part of the wedge portion 21W of cam 21 is located between the pivoting arm 15 and the support member 17.

The cam 21 is resiliently biased towards the first position by a second resilient member, for instance a torsion spring 25 (see in particular FIG. 16). In some embodiments the torsion spring 25 can have a first spring end 25A acting upon the cam 21, and a second spring end 25B acting upon an element which is constrained to the filter housing 7. For instance, the second spring end 25B can act upon a projection 17D (FIGS. 10 and 16) of the support member 17. An intermediate loop 25C of the spring 25 can be used to constrain the spring 25 to a pin 17C of the support member 17 or another member constrained to the filter housing 7.

In order to pivot the cam 21 around the axis 21A thereof against the resilient force of spring 25, a slider 31 is slidingly arranged in the filter holder 1. The slider is illustrated in isolation in a perspective view in FIG. 12. In some embodiments the slider 31 is mounted on a circular guide 33 which is integral with the filter housing seat 5, see in particular FIGS. 3, 4, 5. Advantageously the guide 33 can be arranged on the bottom of the seat 5. The circular guide 33 is generally coaxial with the axis of the valve stopper 13 and the aperture 11, such that the slider 31 moves along a circular trajectory coaxial with the seat 5 and the filter housing 7.

Figure 12:
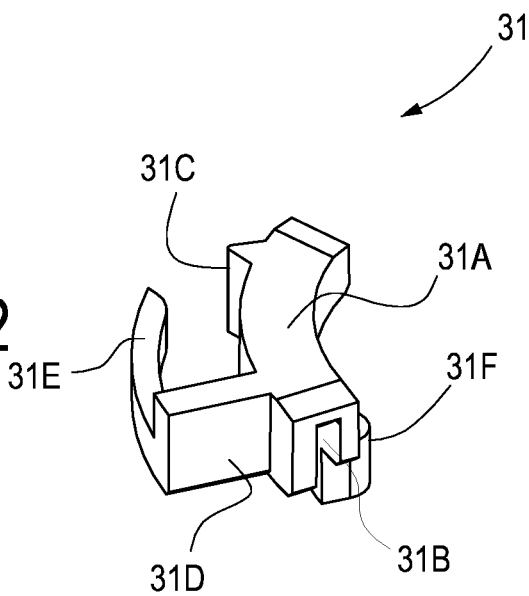
FIG. 12 illustrates a perspective view of a slider housed in the filter holder and co-acting with the actuating ring for operating the cam of FIG. 11.

The shape of an embodiment of the slider 31 can be best appreciated looking at FIG. 12. According to some embodiments, the slider 31 has a slider body 31A with a generally arched shape and provided with an annular slot 31B engaging with the guide 33. On the radially outwardly facing side of the arched slider body 31A a tooth 31C is provided. In some embodiments the tooth 31C can have a generally triangular shape. At a distance from the tooth 31C a projection 31D can be provided, which projects from the radially outwardly facing side of the arched slider body 31A. The projection 31D rigidly connects a tongue 31E to the slider body 31A. The tongue 31A can be arched-shaped and is preferably concentric with the arched slider body 31A. A protrusion 31F extends from the radially inner side of the slider body 31. The protrusion 31F co-acts with the cam 21 for controlling the pivoting movement thereof around the cam axis 21A, as will be better disclosed later on.

As shown in FIG. 15, the slider 31 is resiliently biased by a third resilient member 34, such as a spring, e.g. a spring made of an open ring of spring steel. The spring 34 can be housed in a space 32 (FIG. 3) formed between a recessed surface of the support member 17 and the bottom 9 of the filter housing 7. In some embodiments the spring 34 can have a first end 34A forming an eyelet, which is constrained to a pin 34B that can be integrally formed by or constrained to the bottom of the filter housing 7 (see FIG. 15). The spring 34 further has a second end 34C which freely projects from the space 32 and pushes against the slider 31. The slider 31 can move along the guide 33 between an active position and an inactive position, as will become clear from the description of the operation of the filter holder. The spring 34 biases the slider 31 towards the inactive position.

In the illustrated embodiment the slider 31 co-acts with an actuating ring 35, which is mounted in the filter holder 1 in such a way as to be angularly movable with respect to the seat 5 and the filter housing 7 as will be described in greater detail here below. For instance the actuating ring 35 can be mounted in an annular gap between a side wall 5B of the seat 5 and a side wall 7A of the filter housing 7, the two side walls 5B, 7A being concentric with one another and concentric with the actuating ring 35, see FIG. 3.

Figure 8:
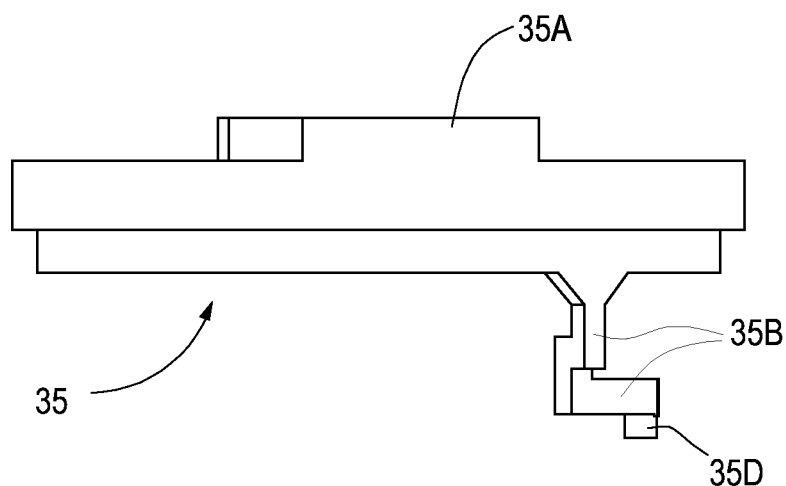
FIGS. 8 and 9 illustrate a side view and a perspective view of an actuating ring of the filter holder.
Figure 9:
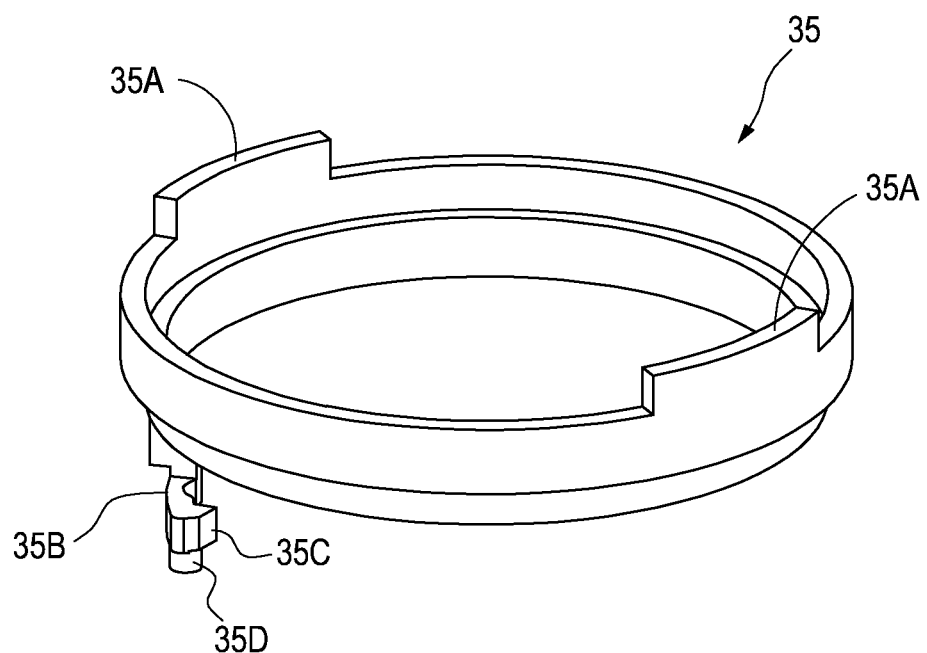
Figure 10:
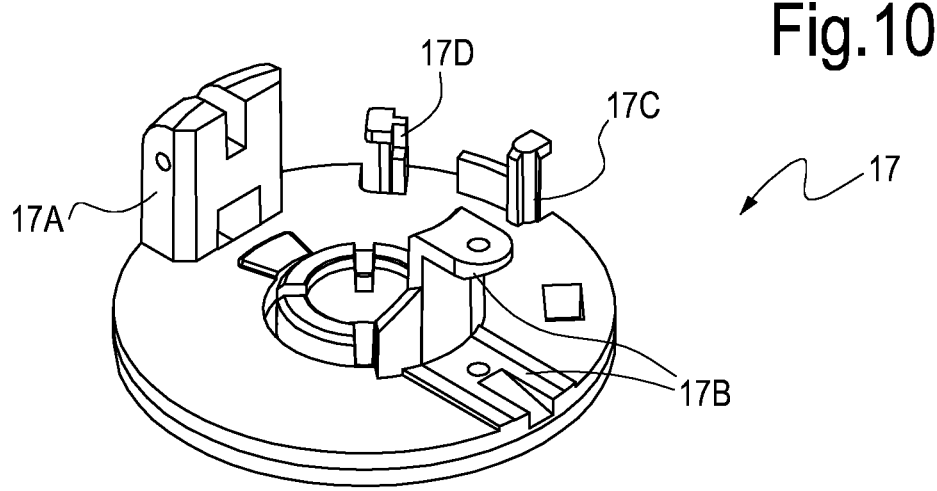
FIG. 10 illustrates a bottom perspective view of a support member supporting a valve stopper of the filter holder.

The actuating ring 35 is shown in isolation in FIGS. 8 and 9.

The actuating ring 35 can be provided with one or more upwardly projecting appendages 35A. In the illustrated example two diametrically opposite appendages 35A are provided. The appendages 35A are configured and arranged for co-action with a stationary element or abutments 37Y (FIG. 17) formed in the locking ring 37, which is part of a coffee machine 2, whereto the filter holder 1 can be connected e.g. by means of a bayonet-type connection.

The locking ring 37 is shown in isolation in FIGS. 13 and 14. The locking ring 37 has a substantially cylindrical inner hollow volume 37C, where the filter housing 7 is introduced when the filter holder 1 is connected to the locking ring 37. Two arc-shaped ridges 37A project radially inwardly in the hollow volume 37C and are separated from one another by two portions 37B where the two arc-shaped ridges 37A are interrupted. One end of each arc-shaped ridge 37A can be rounded or beveled at 37D to allow wings 7B of the filter housing 7 (see FIGS. 6, 7) to ride on the ridges 37A thus establishing a bayonet connection between the filter holder 1 and the locking ring 37.

On the side of the actuating ring 35 opposite the appendages 35A, the actuating ring 35 is provided with a resiliently deformable arm 35B (FIGS. 8 and 9) comprised of a tooth 35C and a pin 35D. The tooth 35C is configured and arranged for co-action with the tooth 31C of the slider 31, whereas the pin 35D is configured and arranged for co-action with a cam profile 39 which can be arranged in the bottom of seat 5. The teeth 35C and 31C form a latch mechanism, which temporarily constrains the slider 31 to the actuating ring 35, as will be better understood from the following description of the filter holder operation.

As best shown in FIG. 5, the cam profile 39 is preferably in the form of a channel and has a radially outwardly projecting indentation 39A, a portion 39B which is substantially coaxial to the cylindrical wall of the seat 5, and a portion 39C which is inclined so as to approach the cylindrical wall of seat 5, for the purposes which will become clearer from the description of the filter holder operation.

The operation of the filter holder described so far is the following.

Generally speaking, the filter holder 1 is placed in a first angular position with respect to the locking ring 37 and introduced with the top portion of the filter housing in the cylindrical cavity 37C of locking ring 37. In the starting position the cam 21 is located such that the valve stopper 13 is kept in the open position (FIG. 3). By means of handle 3 the filter holder 1 is then rotated to lock the filter holder to the locking ring by means of the bayonet connection. During rotation of the filter holder 1 the slider 31 and the actuating ring 35, in combination with the resilient members 19 and 34, will cause the cam 21 to move in a position allowing closure of the valve stopper 13. The latter will be closed by resilient member 19 and remain in the closed position until sufficient water pressure builds up in the filter holder. Once the valve stopper 13 opens under the effect of the pressurized water, the cam 21 acts upon the valve arrangement, so that closure of the valve stopper 13 will be prevented.

More in detail, the above summarized process is as follows.

The starting position of the filter holder 1 with respect to the locking ring 37 is shown in FIG. 2. The position of the inner components of the filter holder are shown in FIG. 3. The annularly shaped cam 21 is angularly positioned so that the thicker part of the wedge-shaped portion 21W is located between the support member 17 and the pivoting arm 15 (FIG. 3). The pivoting arm 15 is thus maintained distanced from the bottom 9 of the filter housing 7 and the valve stopper 13 is prevented from closing the aperture 11. The actuating ring 35 is angularly positioned with respect to the filter housing 7 and the seat 5 such that the appendages 35A thereof are aligned with the wings 7B of the filter housing 7 (see FIG. 2). A cartridge or capsule or loose coffee powder (not shown) can be introduced in the filter housing 7 and the filter holder 1 can be moved in engagement with the locking ring 37 of the coffee machine.

For this purpose, the filter holder 1 is hold by means of the handle 3 in a position such that the wings 7B and the appendages 35A are aligned with the position 37B where the arc-shaped ridges 37A of the locking ring 37 are interrupted, as best shown in the top and partial sectional view of FIG. 2. The wings 7B can be moved vertically in a position higher than the ridges 37A.

At this point, the operator can rotate the filter holder 1 by means of the handle gradually until the final position of FIGS. 24, 25 is achieved, moving through intermediate positions which are shown in FIGS. 15 through 23. For a better understanding of the sequence of movements performed by the components arranged inside the filter holder 1, in the figures depicting the filter holder in the various angular positions the locking ring 37 and/or the axis 3A of the filter holder handle 3 are illustrated. This provides a clear indication of the actual angular position of the filter holder 1 with respect to the locking ring 37 during the various phases of the process of locking the filter holder 1 to the coffee machine 2.

Staring from the initial position of FIG. 2, in FIG. 15 the filter holder 1 has performed a first angle of about 8°, for example. During this first rotation step, all the components arranged in or supported by the filter holder 1 rotate along with the handle 3, the seat 5 and filter housing 7. In the angular position of FIGS. 15 and 16 the appendages 35A of the actuating ring 35 abut against the abutments 37Y (see FIG. 17) provided in the locking ring 37 and are prevented from rotating further. Thus, when the filter holder 1 is further rotated around the axis 37X (FIG. 3) of the locking ring 37, reaching the position of FIGS. 19 and 20, the actuating ring 35 remains stationary with respect to the locking ring 37.

Referring now to FIGS. 19 and 20, with continuing reference to FIGS. 15 and 16, a further rotation of say 30°, approximately, causes a mutual movement of the actuating ring 35 with respect to the filter holder 1. As a matter of fact, the actuating ring 35 remains locked in the angular position of FIGS. 15, 16, while the filter holder 1 and the remaining components thereof rotate by 30° reaching the position of FIGS. 19 and 20. As a consequence of this mutual displacement, the tooth 31C of slider 31, which rotates together with the filter holder 1, abuts against tooth 35C provided on the resiliently deformable arm 35B of the actuating ring 35. During the movement from the position of FIGS. 15, 16 to the position of FIGS. 19, 20 the pin 35D of the actuating ring 35 moves in the channel 39 and the arched tongue 31E of the slider 31 moves behind the arm 35B of the actuating ring 35 preventing the arm 35B from bending radially outwardly. Once this position has been reached, the slider 31 will be locked and prevented from further rotating with the filter holder 1, as the tooth 35C has caught the tooth 31C.

Figure 21:
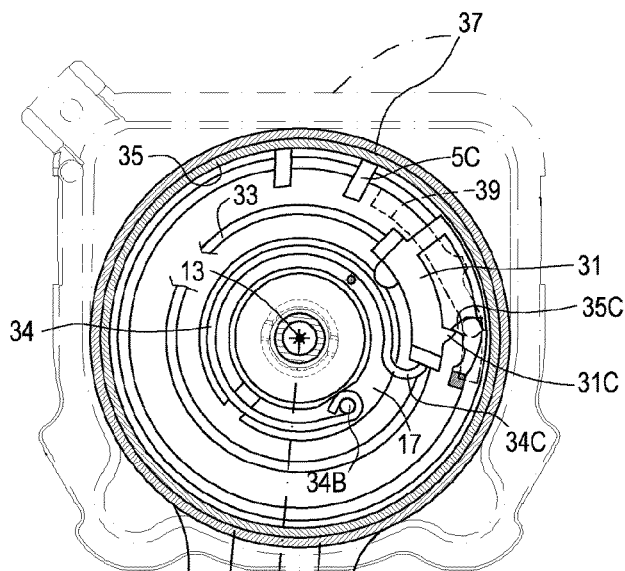
FIGS. 21 and 22 are views similar to FIGS. 19 and 20 in yet a further angular position of the filter holder.
Figure 22:
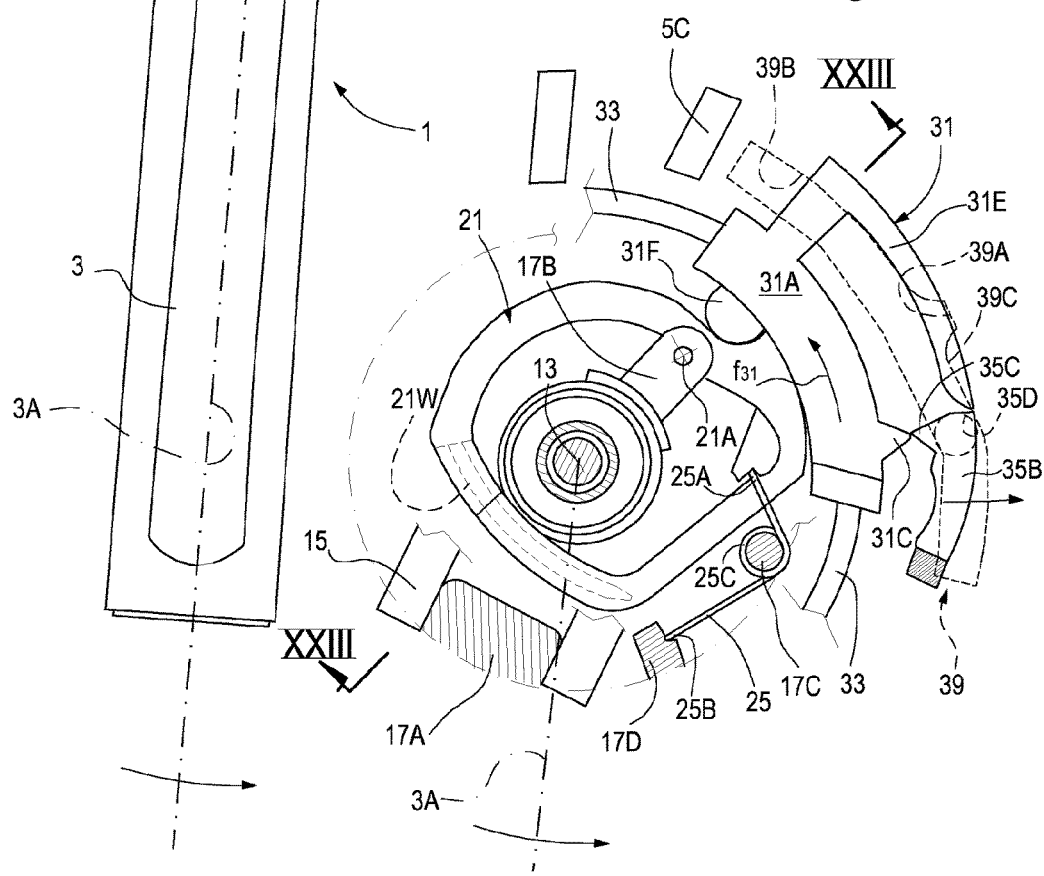

Referring now to FIGS. 21, 22, the rotation of the filter holder 1 acted upon by the user has continued by another 20°, for instance. When the filter holder 1 rotates towards this further angular position, slider 31 remains locked to the actuating ring 35 and thus remains stationary with respect to the locking ring 37. In the position of FIGS. 21, 22 the filter holder 1 has rotated by another 20° approximately, while the slider 31 has remained locked in the previously achieved position (compare FIGS. 18, 20). Since the second end 34C of the spring 34 remains locked by the slider 31, while the first end 34B of said spring 34 follows the movement of the handle 3 of the filter holder 1, the spring 34 is loaded.

During the angular displacement from the position of FIGS. 19, 20 to the position of FIGS. 21, 22, the protrusion 31F remains stationary and locks the cam 21, as the latter cam 21 abuts against the protrusion 31F. Consequently, in the position of FIGS. 21, 22, the cam 21 has rotated around its rotation axis 21A by a certain angle. The rotation movement of the cam 21 has caused the wedge 21W thereof to be displaced with respect to the arm 15. Now, the thinner portion of the wedge 21W is arranged between the bottom 9 of the filter housing 7. The arm 15 is thus caused to pivot upwards towards the bottom 9 by the first resilient member 19. The valve stopper 13 thus closes the aperture 11, as shown in the vertical cross-sectional view of FIG. 23.

During the movement from the position of FIGS. 19, 20 to the position of FIGS. 21, 22 the pin 35D of the actuating ring 35 rides in the channel 39 preventing the arm 35B of the actuating ring 35 from bending radially outwardly, such that the teeth 31C and 35C remain engaged with one another, until the angular position of FIGS. 21, 22 is achieved. At this point the pin 35D has moved along the portion 39C of the channel 39, which is inclined towards the periphery of the filter seat 5, thus causing a radial outwardly oriented displacement of the arm 35B and thus a radial outward movement of the tooth 35C. This finally causes the tooth 31C to disengage from tooth 35C.

As soon as the tooth 35C is disengaged, the energy stored in the spring 34 pushes the slider 31 forwards (see arrow f31 in FIG. 22) causing the movement of the slider 31 along the guide 33 with respect to the seat 5, until the slider 31 abuts against a stop 5C integral with the seat 5. FIGS. 24, 25 illustrate the final position of the filter holder 1 an inner components thereof. The slider 31 has reached the final position in abutment against stop 5C The protrusion 31F has been distanced from the cam 21. The latter, however, does not move under the thrust of the third resilient member 25, since the friction between the cam 21 and the arm 15, the latter being pushed by the first resilient member 19, generates a resistive torque on the cam 21 which is higher than the torque applied by the second resilient member 25.

The position thus achieved by the filter holder is the final locked position where the brewing cycle can start. Hot water is thus dispensed through the locking ring 37 towards and into the capsule or the coffee cake (not shown) arranged in the filter housing 7. Pressure builds up in the filter housing and the coffee powder is soaked with hot and pressurized water. As soon as the pressure in the filter housing 7 is sufficient to overcome the force of spring 19, the valve stopper 13 opens and the pivoting arm 15 moves around axis 15A downwardly, thus releasing the cam 21. The spring 25 biases the cam 21 towards its first position, where the thicker part of the wedge portion 21W is located between the support member 17 and the pivoting arm 15. I.e. the cam 21 returns in the position of FIG. 3.

Coffee is dispensed through the aperture 11 and the ports 5A until the brewing cycle is completed. Upon completion of the brewing cycle, pressurized water delivery is stopped, the pressure in the filter housing 7 is released through the aperture 11 and the ports 5A, since the valve stopper 13 remains in the open position. Closure of the valve stopper 13 is prevented by the thicker part of the wedge portion 21W of cam 21, which has moved above the pivoting arm 15.

The filter holder 1 can then be detached from the locking ring 37 and removed from the coffee machine 2.

Figure 26:
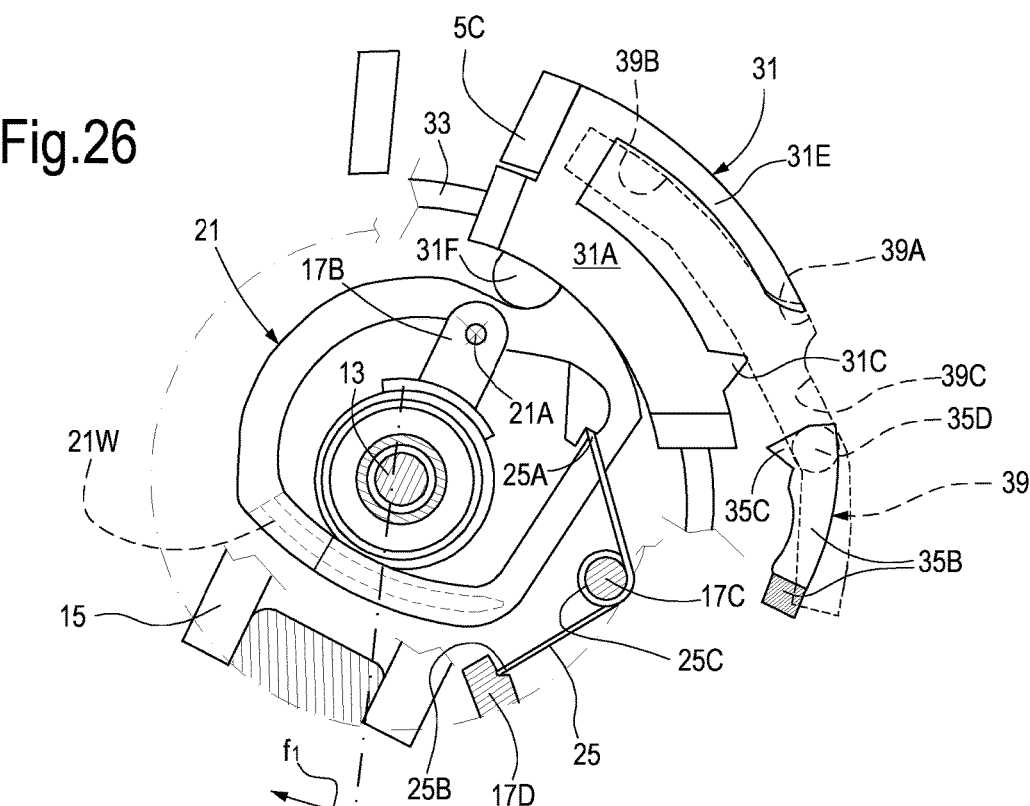
FIGS. 26 to 28 are views similar to FIG. 25 in three angular positions of the filter holder during removal from the locking ring.
Figure 27:
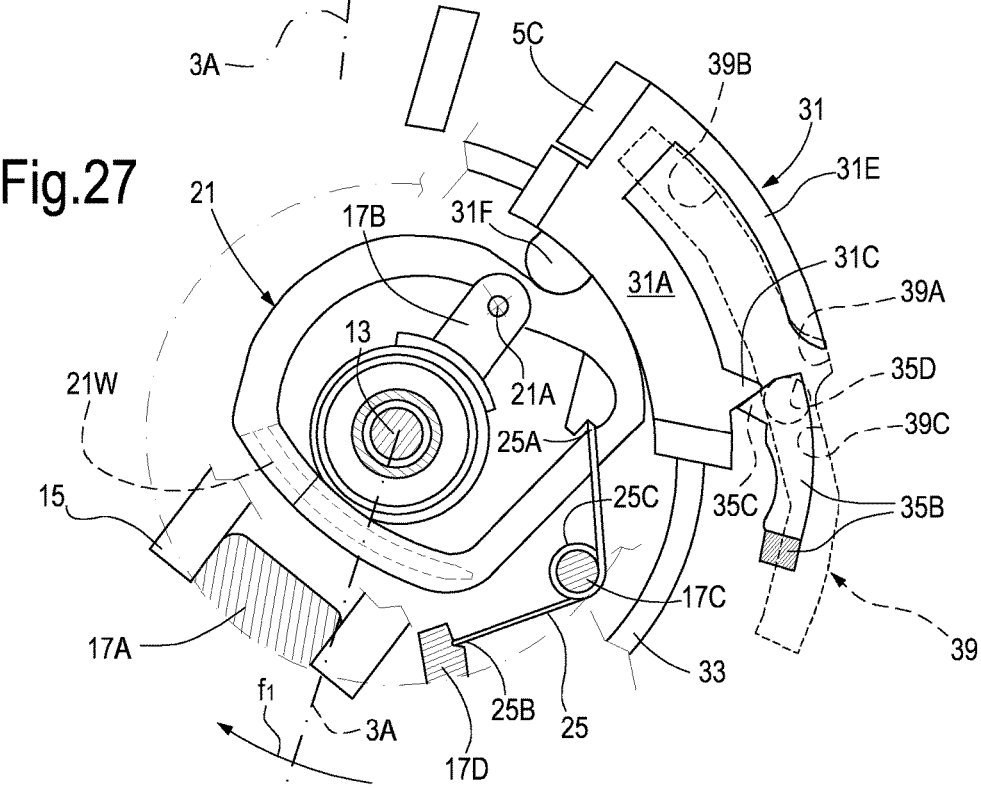
Figure 28:
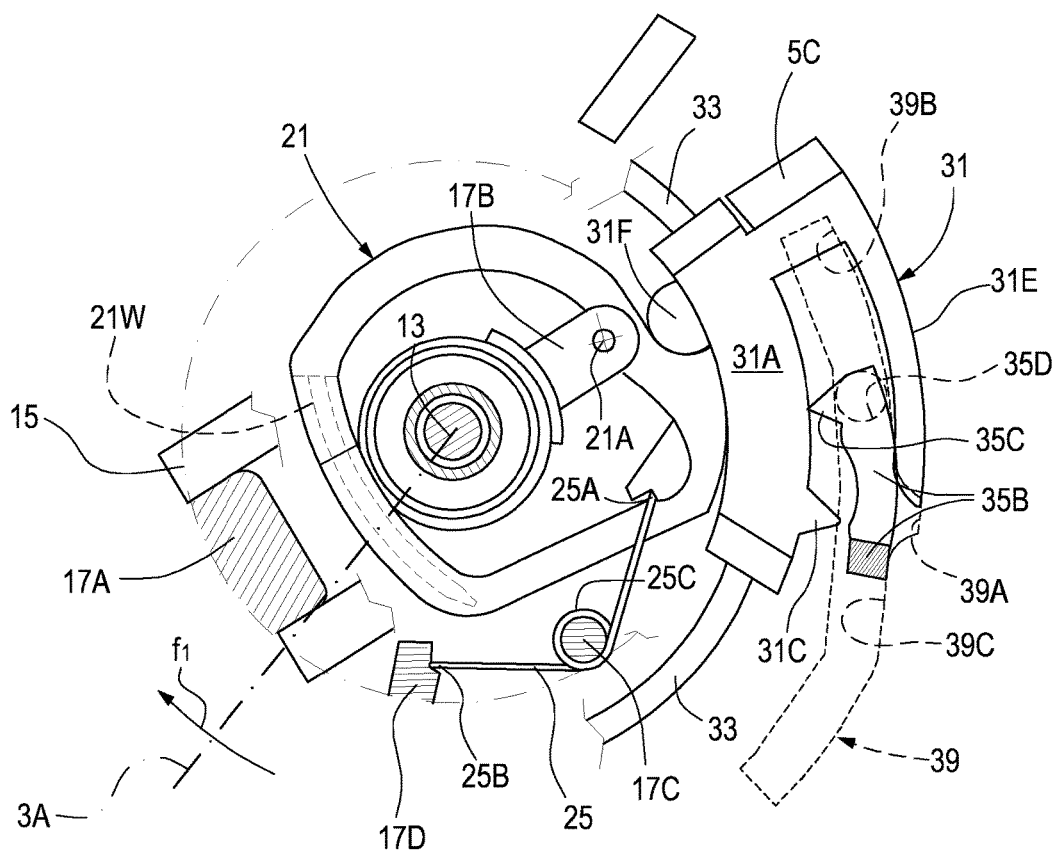

FIGS. 26 to 28 illustrate, according to views similar to FIG. 25, the movement of the filter holder 1, slider 31 and actuating ring 35 in the first phase of the removal step. Rotation of the filter holder 1 through the handle 3 (arrow f1 in FIGS. 26 to 28) causes the stop 5C to push the slider 31 and the tooth 31C thereof against the tooth 35C of the actuating ring 35. The thrust of tooth 31C against tooth 35C causes a radial outward displacement of arm 35B. The movement is allowed by the pin 35D being pushed in indentation 39A. As shown in FIG. 27 the tooth 31C rides over tooth 35C and the latter can then move back in the rest position. The further rotation of the filter holder 1 (FIG. 28) will then bring the slider 31 and the actuating ring 35 back in the starting position of FIGS. 15 and 16. When the filter holder 1 is brought back in the angular position of FIG. 2, the filter holder 1 can be removed from the locking ring 37.

The spent coffee or the spent capsule is then removed from the filter holder and the filter holder 1 can be washed. Water can freely flow through the various components of the filter holder 1 thanks to the valve stopper 13 being maintained in the open position by cam 21.

The open position (FIG. 3) of valve 12 and valve stopper 13 is maintained until the filter holder 1 is once again loaded with coffee and locked to the locking ring 37 repeating the above described procedure.

As can be appreciated from the above description, the filter holder according to the invention has a valve which can be maintained constantly open until the final locking position of the filter holder in the locking ring is approached, by moving the cam 21. Once the very final locking position has been achieved, the cam 21 is again moved in a valve inhibiting position, i.e. in a position where the cam will prevent closure of the valve stopper 13. The valve stopper 13 opens under the action of the pressurized water and will be prevented from closing again.

The entire process is performed without any action required on the side of the user, who has just to rotate the filter holder through the handle 3 from a first inserting position (FIG. 2) until reaching the final angular position (FIGS. 21, 22). The entire movements of the members inside the filter holder 1 is automatically caused by the interaction of the actuating ring 35 with the locking ring 37 on the one side and with the slider 31 on the other side and by the interaction between the slider 31 and the cam 21.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A filter holder comprising:
    a filter housing provided with a bottom and a dispensing aperture through said bottom;
    first, second and third resilient members;
    a valve with a valve stopper, arranged for selectively opening and closing the dispensing aperture, the stopper being supported by a pivoting arm and resiliently biased by the first resilient member towards a closed position;
    a cam arranged between the bottom of the filter housing and the pivoting arm, the cam having a cam profile co-acting with the pivoting arm, the cam having at least a first position wherein the cam profile prevents closing movement of the valve stopper and a second position wherein the cam profile allows closing movement of the valve stopper, the cam being resiliently biased by the second resilient member towards the first position;
    a slider which co-acts with the cam to move the cam from the first position towards the second position;
    wherein the slider is resiliently biased by the third resilient member in an inactive position and is forced to move towards an active position by co-action with an element of a locking ring in response to the filter holder being attached; and wherein the slider is arranged for pushing the cam towards the second position when the slider is moved towards the active position.

2. The filter holder of claim 1, wherein the cam is pivotally connected to the bottom of the filter housing around a first pivoting axis oriented at about 90° with respect to a second pivoting axis of the pivoting arm which supports the valve stopper.

3. The filter holder of claim 2, wherein the first pivoting axis is approximately orthogonal to the bottom of the filter housing.

4. The filter holder of claim 1, wherein the filter housing is arranged in a seat integral with a filter-holder handle, and wherein the pivoting arm and the cam are arranged between the filter housing and a bottom wall of the seat.

5. The filter holder of claim 4, wherein the first resilient member, which resiliently biases the valve stopper towards the closed position, is arranged between the bottom of the seat and the valve stopper.

6. The filter holder of claim 1, further comprising a guide whereon the slider is movably mounted.

7. The filter holder of claim 4, wherein the filter housing comprises a cam support mounted on the bottom of the filter housing between the filter housing and the seat, and wherein the cam is pivotally connected to the cam support.

8. The filter holder of claim 7, wherein the third resilient member is arranged on the filter housing, for resiliently biasing the slider in the inactive position thereof and is located between the filter housing and the cam support.

9. The filter holder of claim 1, further comprising an actuating ring arranged around the filter housing and co-acting with the slider; wherein the actuating ring has a limited angular movement with respect to the filter housing and wherein the actuating ring co-acts with the locking ring whereto the filter holder is attached.

10. The filter holder of claim 9, further comprising a latch mechanism for selectively constraining the actuating ring to the slider, and releasing the slider from the actuating ring such that the slider can move angularly with respect to the actuating ring.

11. The filter holder of claim 10, wherein the latch mechanism comprises a first tooth constrained to the slider and a second tooth constrained to the actuating ring, the first tooth and the second tooth co-acting with one another to selectively constraining the slider to the actuating ring and releasing the slider and the actuating ring from one another.

12. The filter holder of claim 11, wherein the second tooth is radially outwardly movable in a release position, where the first tooth and the second tooth are disengaged from one another, when the actuating ring and the filter housing have achieved a mutual angular shift.

13. The filter holder of claim 11, wherein the second tooth engages a cam profile constrained to the filter housing, the cam profile being configured such that when the actuating ring and the filter housing are displaced one with respect to the other by a predetermined extent, the second tooth moves radially outwardly disengaging from the first tooth.

14. The filter holder of claim 11, wherein an angular shift of the actuating ring with respect to the filter housing causes a corresponding movement of the slider from the inactive position to the active position and therefore a movement of the cam from the first position to the second position, and wherein upon angular release of the slider from the actuating ring the slider is resiliently pushed back towards the inactive position.

15. A beverage producing machine including a filter holder according to claim 1 and a locking ring, the filter holder being engageable to and disengageble from said locking ring.

* * * * *